United States Patent [19]

Kessler

[11] Patent Number: 5,768,645
[45] Date of Patent: Jun. 16, 1998

[54] DISPOSABLE CAMERA WITH ALIGNMENT MEANS FOR ASSISTING IN TAKING SELF/GROUP PORTRAIT PICTURES

[76] Inventor: Henri Marc Kessler, 142 W. 26th St., Suite 2B, New York, N.Y. 10001

[21] Appl. No.: 660,348

[22] Filed: Jun. 5, 1996

[51] Int. Cl.⁶ .................... G03B 17/00; G03B 17/38
[52] U.S. Cl. .................. 396/376; 396/425; 396/428; 396/504
[58] Field of Search .................. 354/81, 82, 293, 354/220; 396/373, 376, 419, 420, 425, 428, 502, 504, 535

[56] References Cited

U.S. PATENT DOCUMENTS

| | | | |
|---|---|---|---|
| D. 325,741 | 4/1992 | Arai | D16/208 |
| 1,099,820 | 6/1914 | Ridings | 396/376 |
| 2,498,137 | 2/1950 | Ryder | 396/425 |
| 2,515,558 | 10/1950 | Mihalyi | 396/377 |
| 2,868,096 | 1/1959 | Rothfjell | 396/420 |
| 4,219,268 | 8/1980 | Uchida | 396/428 |
| 4,530,580 | 7/1985 | Ueda et al. | 396/425 |
| 4,560,261 | 12/1985 | Ueda et al. | 376/376 |
| 4,771,300 | 9/1988 | Bryan | 396/428 |
| 4,999,657 | 3/1991 | Leuer | 396/376 |
| 5,239,326 | 8/1993 | Takai | 396/529 |

*Primary Examiner*—Safet Metjahic
*Assistant Examiner*—J. K. Han
*Attorney, Agent, or Firm*—Pennie and Edmonds LLP

[57] ABSTRACT

The present invention relates to a camera which comprises a camera unit including a housing with a front face and a bottom. A lens assembly is located within the housing and extends to the front face of the housing. A shutter is located within the housing. The camera further comprises a mirror member covering substantially the entire front face of the housing and being discontinued where the lens extends to the front face. The mirror member is marked with at least two lines that would intersect at the center of the lens. A remote shutter release mechanism is provided connected with the camera unit. At least one supporting arm is mounted to the housing and extending therefrom to a remote end for the user to hold. The supporting arm preferably has a length greater than two feet. Therefore, the user(s) can hold the camera away from himself (themselves), locate himself (themselves) in the mirror and use the remote shutter release mechanism to take portrait type pictures.

16 Claims, 12 Drawing Sheets

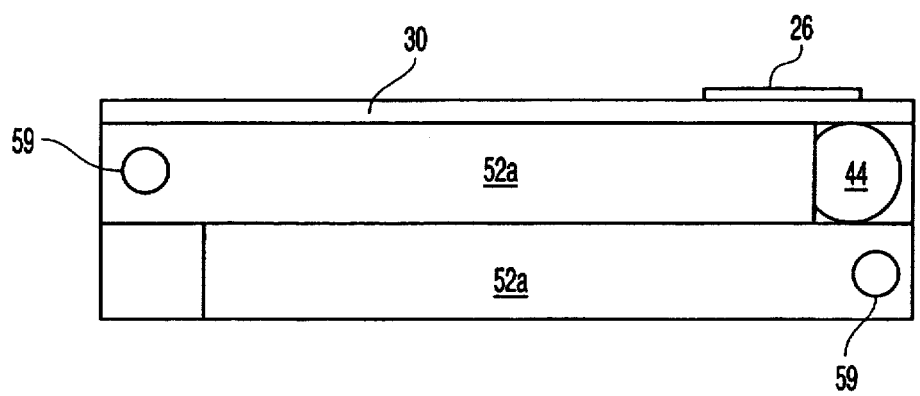
FIG. 13
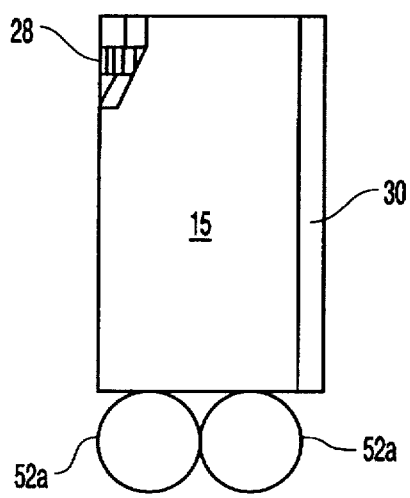 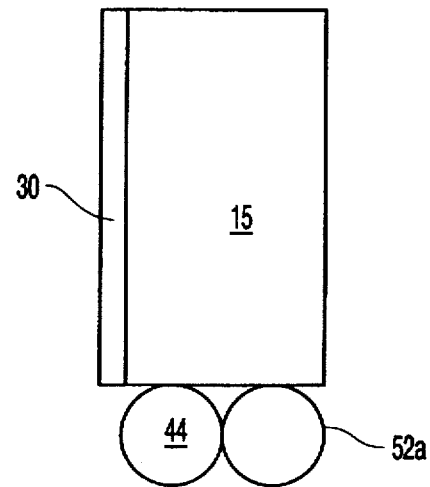
FIG. 14    FIG. 15

5,768,645

DISPOSABLE CAMERA WITH ALIGNMENT MEANS FOR ASSISTING IN TAKING SELF/GROUP PORTRAIT PICTURES

FIELD OF THE INVENTION

The present invention relates to a camera for taking self or group portrait pictures. The camera of the present invention assists the user to observe himself, alone or as part of a group, when a portrait picture is taken, and therefore ensures that the user(s) is positioned as desired in the picture. In particular, the present invention relates to a disposable camera having cross-lined front mirror and supporting arms for assisting the user in taking pictures.

BACKGROUND OF THE INVENTION

Disposable cameras have become very popular. They are particularly convenient when traveling or at parties. For example, U.S. Pat. No. 5,239,326 discloses a film-loaded disposable camera with an auxiliary lens. However, current disposable cameras are inconvenient for taking your own photograph. Therefore, when traveling as a couple, you often end up with pictures of only one person at a time. When an individual is traveling alone, most pictures are of the scenery and do not include the individual.

When a camera is used to take self-portrait pictures, it is usually held away from the user. Such an arrangement makes it generally impossible for the user to know his own position within the coverage of the lens or his position relative to other objects within the scene to be photographed. Therefore, the user often has difficulties to position himself and/or background scenes as desired in the picture obtained.

U.S. Pat. No. 4,560,261 issued to Ueda et al. discloses a flat camera with a self photograph framing mirror. The framing mirror is disposed at a suitable position on the front side of the camera. When such flat camera is used for taking self-portrait pictures, the framing mirror assists the user in observing himself within the coverage of the lens and taking desired pictures.

However, there is no reference mechanism in such framing mirror to assist the user in centering himself in the picture. Even though the framing mirror helps the user observe himself when taking a self-portrait picture, it is still difficult for the user to accurately locate, especially center, himself in a picture as desired.

Therefore, it is desirable to provide a camera which enables the user to easily observe and accurately position himself when a portrait picture is taken so that the obtained picture would have the user in a desired position. Moreover, it is important to make a camera that is easy and inexpensive to manufacture, but still enables a person to take a portrait picture of himself or of a group. The present invention provides such a camera to meet the requirements.

SUMMARY OF THE INVENTION

The present invention relates to a camera that enables the user to take portraits of himself or a group, is compact, and is easy to manufacture. Thus, it is ideal for a disposable camera.

The present invention relates to a camera which comprises a camera unit including a housing with a front face and a bottom. A lens assembly is located within the housing and extends to the front face of the housing. A shutter is located on the housing. The camera further comprises a mirror member covering substantially the entire front face of the housing and being discontinued where the lens extends to the front face. The mirror member is marked with at least two lines that would intersect near the center of the lens. At least one supporting arm is mounted to the housing and extending therefrom to a remote end for the user to hold. A remote shutter release mechanism is provided at the remote end. The supporting arm preferably have a length greater than about two feet. Therefore, the user can hold the camera away from himself, locate himself or the group in the mirror at a desired position and use the remote shutter release mechanism to take pictures that include the picture taker, individually or in a group.

The supporting arm has a plurality of telescoped arm sections including a base section. The base section is pivotally mounted to the housing of the camera unit. The supporting arm has each of its arm sections define a through chamber for passing the remote shutter release mechanism therethrough to extend from the housing of the camera unit to the remote end of the supporting arm.

In a first preferred embodiment, the supporting arm is a rod, and the base section of the telescoped rod is mounted to the bottom of the housing. Each section of the supporting arm has a length slightly shorter than the length of the camera unit and a width equal to or less than the width of the camera so that the telescoped rod can be folded underneath the housing when it is retracted.

In another preferred embodiment, the cross-section of each through chamber in the supporting arm is rectangular. The area of the cross-section is sufficiently large so that the arm section can receive the camera unit therein. Each section of the supporting arm has a length slightly longer than the length of the camera unit so that the camera unit can be received within the arm sections when the telescoped arm is retracted.

In a further preferred embodiment, the supporting arm has a plurality of hinged arm sections including a base section. The base section is pivotally mounted to the bottom of the housing of the camera unit. The arm sections have lengths substantially equal to the height and thickness of the camera unit alternatively so that the arm sections can wrap around the camera unit. Alternatively, the arm sections can have a length substantially equal to one of the height and the thickness of the camera unit so that the arm sections can be rolled up and kept next to one of the front face and the bottom of the camera unit. In addition, one of the at least one supporting arm has each of its arm sections define a through hole for passing the remote shutter release mechanism therethrough.

The remote shutter release mechanism of the camera comprises a pneumatic cable and an air bulb. The pneumatic cable is connected between the shutter within the camera unit and the air bulb.

The mirror member of the camera is substantially flat. The material of mirror member is an optical quality plastic with a silver metal backing. On the mirror member of the camera, one of the lines extends horizontally and the other vertically such that they would intersect with each other at the camera lens. Alternatively, the lines can extend diagonally across the front face of the housing such that they would intersect with each other at the camera lens.

The camera unit and the supporting arm of the camera can be made of plastic materials. Further, the camera is preferably a disposable camera.

The present invention further relates to a camera comprising a camera unit having a housing with a front face and a bottom. A lens assembly is located within the housing and extends to the front face of the housing and a shutter located within the housing. The camera also comprises a mirror member covering at least part of the front face of the housing and being discontinued where the lens extends to the front face. The mirror member is marked with at least two lines that would intersect at the center of the lens. A remote shutter release mechanism is connected with the camera unit. At least one supporting arm is mounted to the housing and extending therefrom to a remote end for the user to hold. Therefore, the user can hold the camera away from himself, locate himself or a group in the mirror and use the remote shutter release mechanism to take pictures.

BRIEF DESCRIPTION OF THE DRAWINGS

These and other features, aspects, and advantages of the present invention will become much more apparent from the following description, appended claims, and accompanying drawings, in which:

FIG. 13 is a bottom view of the camera shown in FIG. 10;

FIG. 14 is a left side view of the camera shown in FIG. 10;

FIG. 15 is a right side view of the camera shown in FIG. 10;

DETAILED DESCRIPTION OF THE PREFERRED EMBODIMENTS

Figure 1:
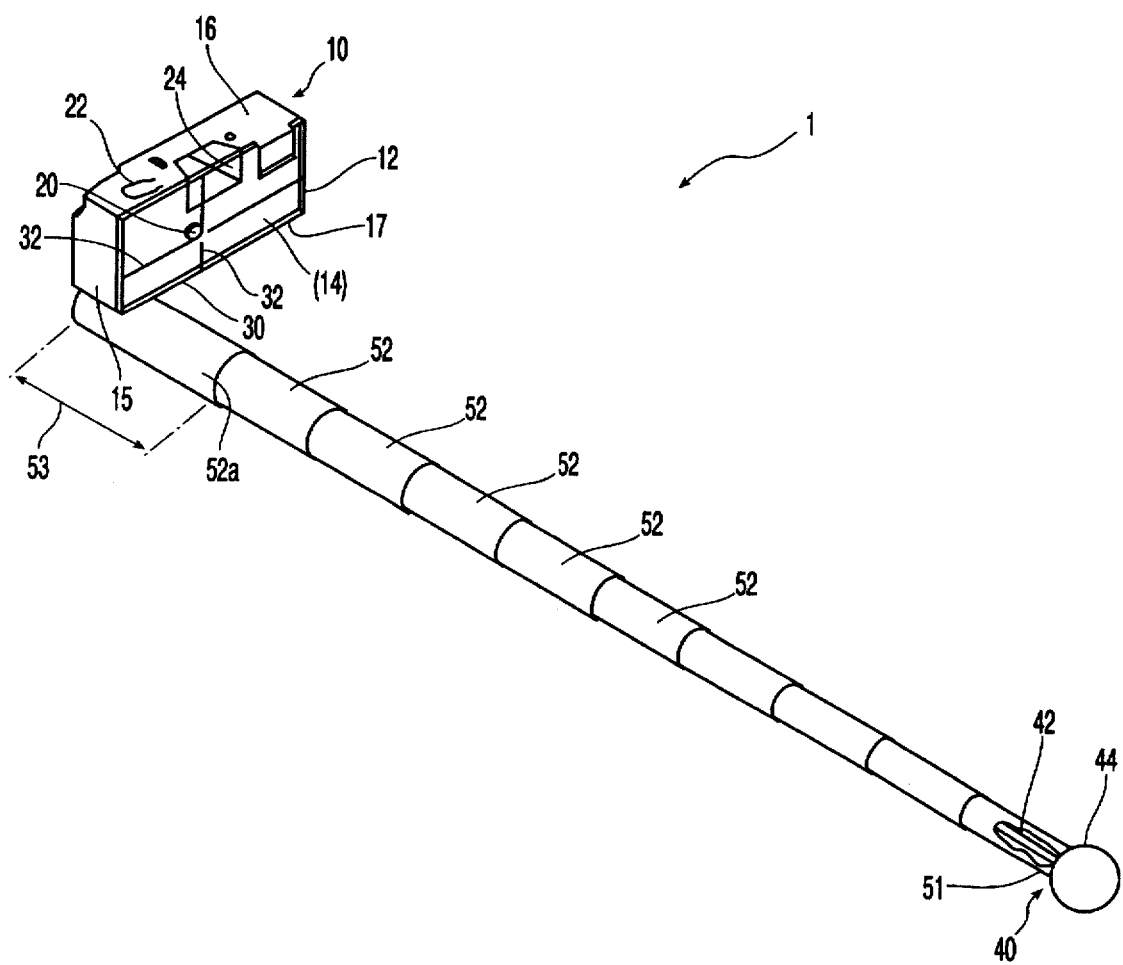
FIG. 1 is a perspective view of a first embodiment of the present invention as the camera is being used.

A camera 1 embodying the principles of the present invention is illustrated in FIGS. 1–20. The camera 1 of the present invention has a mechanism for assisting the user to accurately locate himself or a group within the coverage of the lens when taking self-portrait type pictures and therefore ensures the user or users are in a desired position in the final picture.

FIGS. 1–8 show a first embodiment of the camera 1 of the present invention. The camera 1 has a camera unit 10, which can be a typical camera, but preferably is a disposable camera. The camera unit 10 has a housing 12 with a front face 14, a back face 11, two side faces 15, a top 16 and a bottom 17. The housing 12 can be in a shape of a block with a length L and a height H extending horizontally and vertically across the front face 14 and a width W extending perpendicular to the front face 14 across the bottom 17. The camera unit 10 further has a lens assembly 20, a shutter (not shown), a shutter trigger 22, a view finder 24, a flash light 26 and a counting dial 28 similar to those in prior art disposable cameras. The lens assembly 20 and the view finder 24 are at least partly held within the housing 12 and extend to the front face 14 of the housing 12. The shutter trigger 22 is located on the camera unit 10, preferably on the top 16 of the housing 12.

The flash light 26, located on the front face 14 of the camera unit 10, flashes with the release of the shutter. The flash light 26 can be charged by pressing a switch (not shown) below the flash light 26 on the front face 14. When the flash light 26 is charged with sufficient power to flash, an indicator 29 at the top 16 of the camera unit 10 flashes to show that the flash light 26 is at its charged state. The indicator 29 continues to flash until the charge slowly drains out of the flash light 26. The flash light 26 stays charged for approximately ten seconds.

A mirror member 30 is provided on the front face 14 of the housing 12 for assisting the user to observe himself when taking self-portrait pictures. The mirror member 30 is substantially flat and covers at least part of the front face 14 of the housing 12. In a preferred embodiment, the mirror member 30 covers substantially the entire front face 14 of the housing 12. It is understood that the mirror member 30 is discontinued where the lens assembly 20 and the view finder 24 extend to the front face 14. The mirror member 30 is of a lightweight optical quality plastic with a silver metal backing (not shown). The backing is removed where the lens assembly 20 and the view finder 24 extend on the front face 14 of the housing 12 to allow clear viewing and image photography. By making the mirror extend across substantially the entire face, the mirror can be easily manufactured for an inexpensive disposable camera and yet allow the user to easily locate the subject of the picture.

To further assist the user to accurately locate himself within the coverage of the camera lens 20, the mirror member 30 is marked with at least two lines 32. These two lines 32 can orient in many ways but would intersect near the center of the camera lens 20. In the preferred embodiment as shown in FIGS. 1–8, one of the lines 32 extends horizontally and the other vertically. In another preferred embodiment shown in FIG. 10, the lines 32 extend diagonally across the mirror member 30 and still intersect with each other near the camera lens 20. When taking pictures, the user can simply center himself or the group, when there is more than one person to be taken in a picture, on the intersection of the two lines 32. The user can also use the crossed lines 32 as reference to locate himself, the crowd or the background in any desired position.

As described hereinabove, the camera unit 10 has a shutter trigger 22 located on, preferably the top 16 of, the housing 12. To facilitate the user in taking self-portrait type pictures, a remote shutter release mechanism 40 (see FIGS. 1 and 16) is provided connecting with the shutter (not shown) of the camera unit 10. Preferably, the remote shutter release mechanism 40 comprises a pneumatic cable 42 connected between the shutter of the camera unit 10 and a separate air bulb 44. The remote shutter release mechanism 40 can also be a piezoelectric switch or the like.

The pneumatic cable 42 is made with soft rubber or soft plastic tubing. The air bulb 44 can be molded with soft rubber and welded to one end of the pneumatic cable 42. The pneumatic cable 42 and the air bulb 44 thus communicate with each other. On the other end, the pneumatic cable 42 interacts with the shutter inside the camera unit 10 through a pressure sensitive pin (not shown). The pin is designed to rest at an off position when the air pressure inside the pneumatic cable 42 and the air bulb 44 is low. When the air pressure inside the pneumatic cable 42 and the air bulb 44 increases, the pin raises to release the spring loaded shutter in the camera unit 10.

When taking self-portrait type pictures, the user can squeeze the air bulb 44 remote from the camera unit 10. The air pressure inside the pneumatic cable 42 and the air bulb 44 is thus built up. Thereafter, the pin is raised under the high pressure to release the spring loaded shutter in the camera unit 10. Therefore, the user can release the shutter in the camera unit 10 to take pictures even when he is physically away from the camera unit 10.

At least one supporting arm 50 is provided for the user to hold the camera unit 10 away from himself in taking self-portrait pictures. The supporting arm 50 has one of its ends pivotally mounted to the housing 12 through various conventional means such as screwing and hinging. The other end of the supporting arm 50 extends from the camera unit 10 to a remote end 51 for the user to hold. The length of the supporting arm 50 is preferably two feet. More preferably, the supporting arm 50 is three to five feet in length. The supporting arm 50 can be made of various materials, such as metal and high density, ultra-light, smooth plastics.

Figure 2:
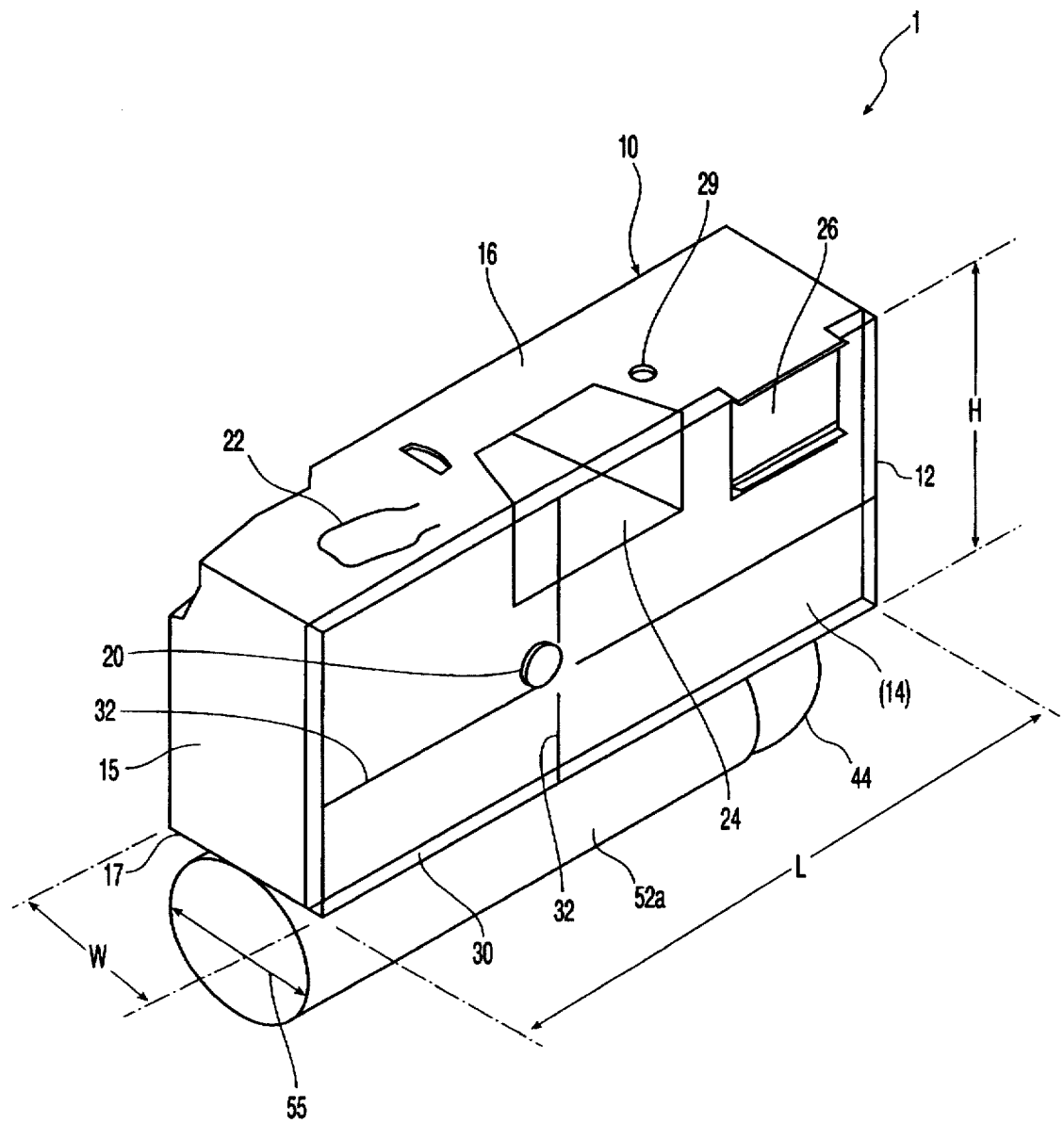
FIG. 2 is a perspective view of the camera in FIG. 1 in a retracted position.
Figure 3:
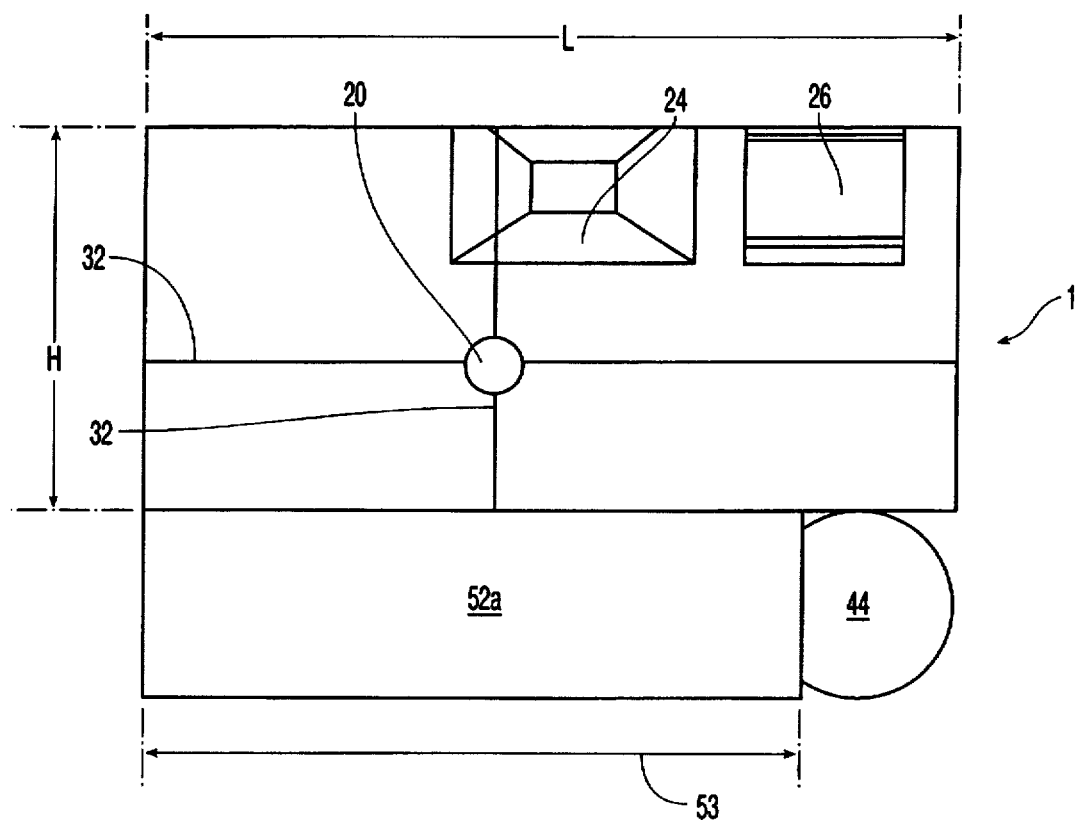
FIG. 3 is a front view of the camera shown in FIG. 2.
Figure 4:
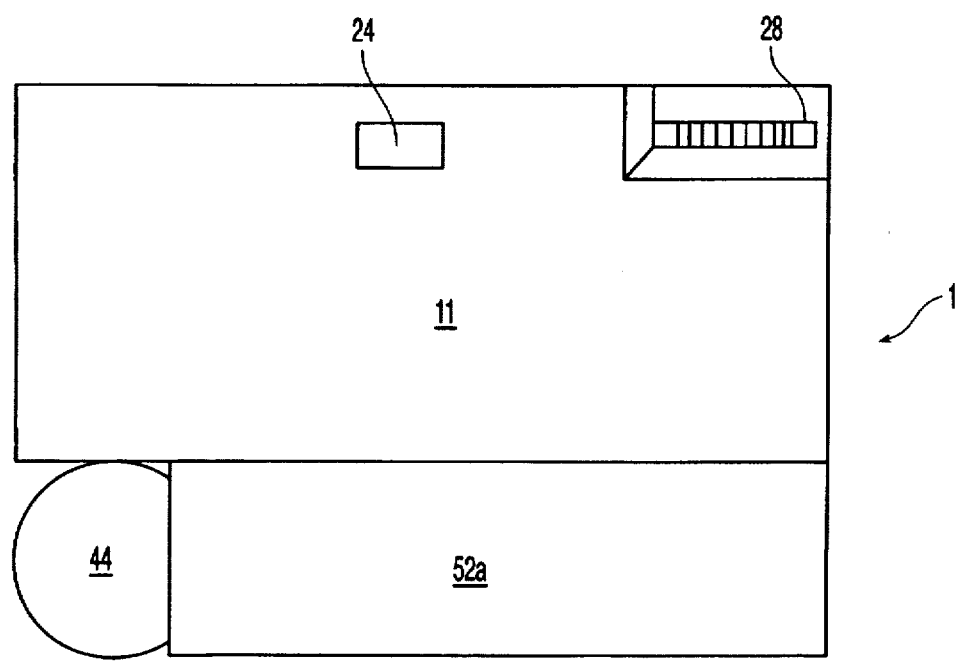
FIG. 4 is a rear view of the camera shown in FIG. 2.
Figure 5:
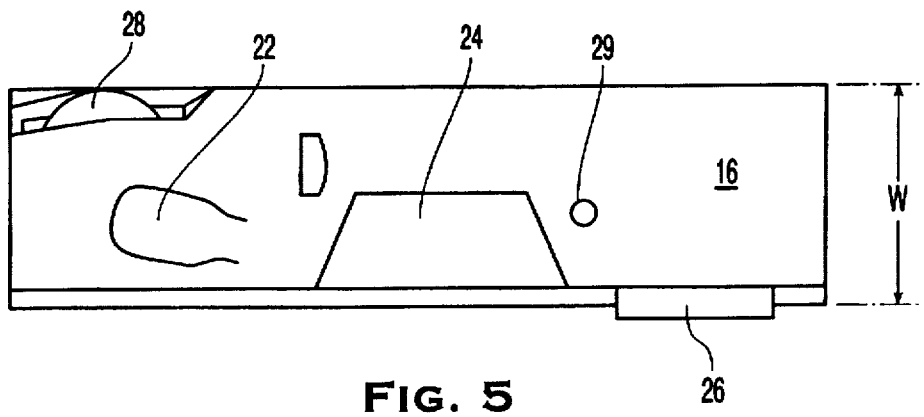
FIG. 5 is a top view of the camera shown in FIG. 2.
Figure 6:
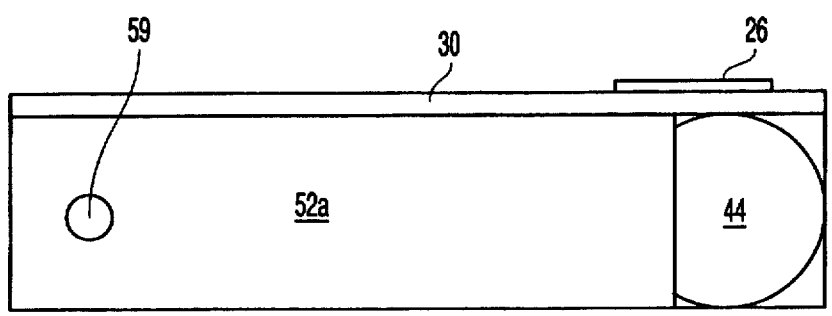
FIG. 6 is a bottom view of the camera shown in FIG. 2.
Figure 7:
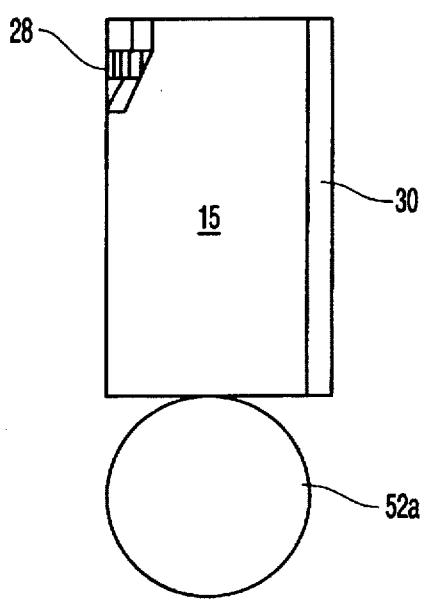
FIG. 7 is a left side view of the camera shown in FIG. 2.
Figure 8:
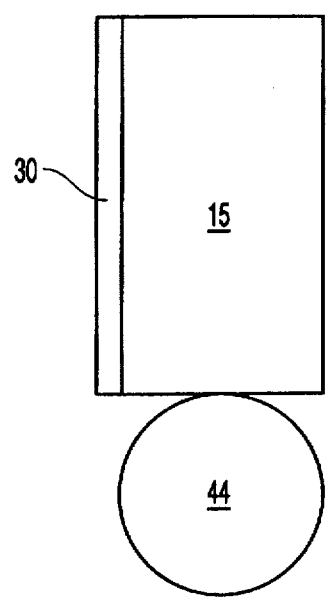
FIG. 8 is a right side view of the camera shown in FIG. 2.
Figure 9:
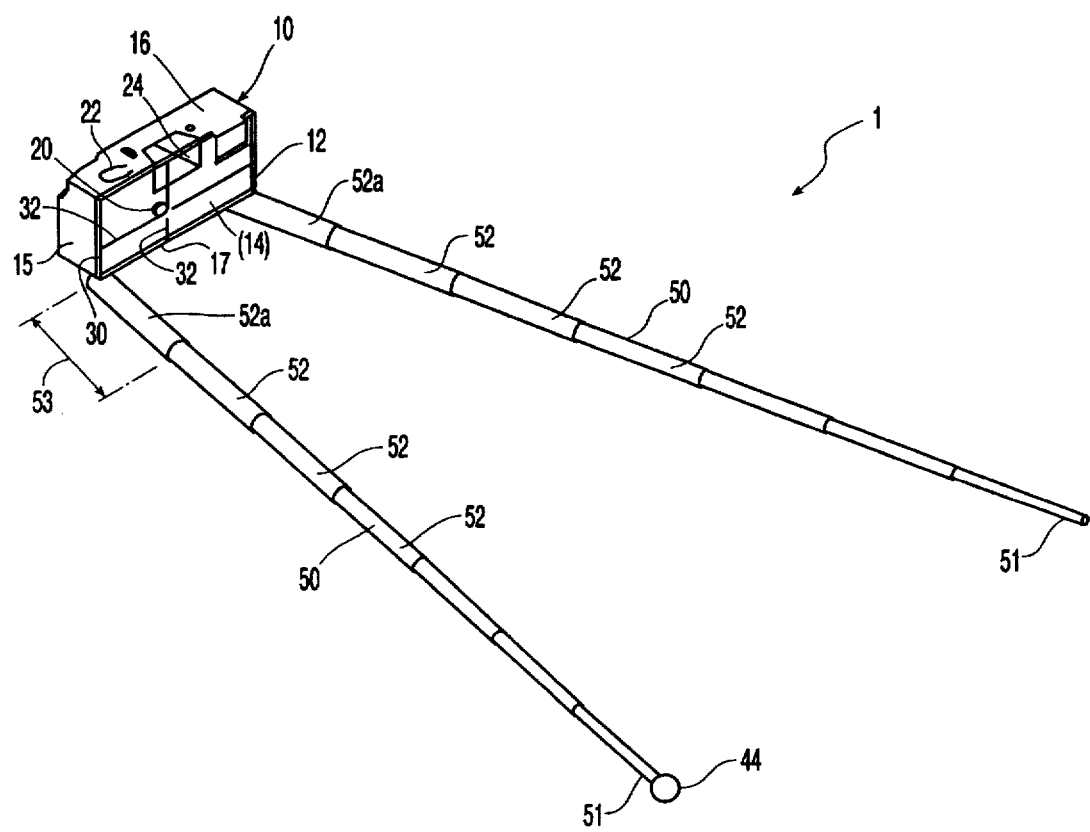
FIG. 9 is a perspective view of a second embodiment of the present invention as the camera is being used.
Figure 10:
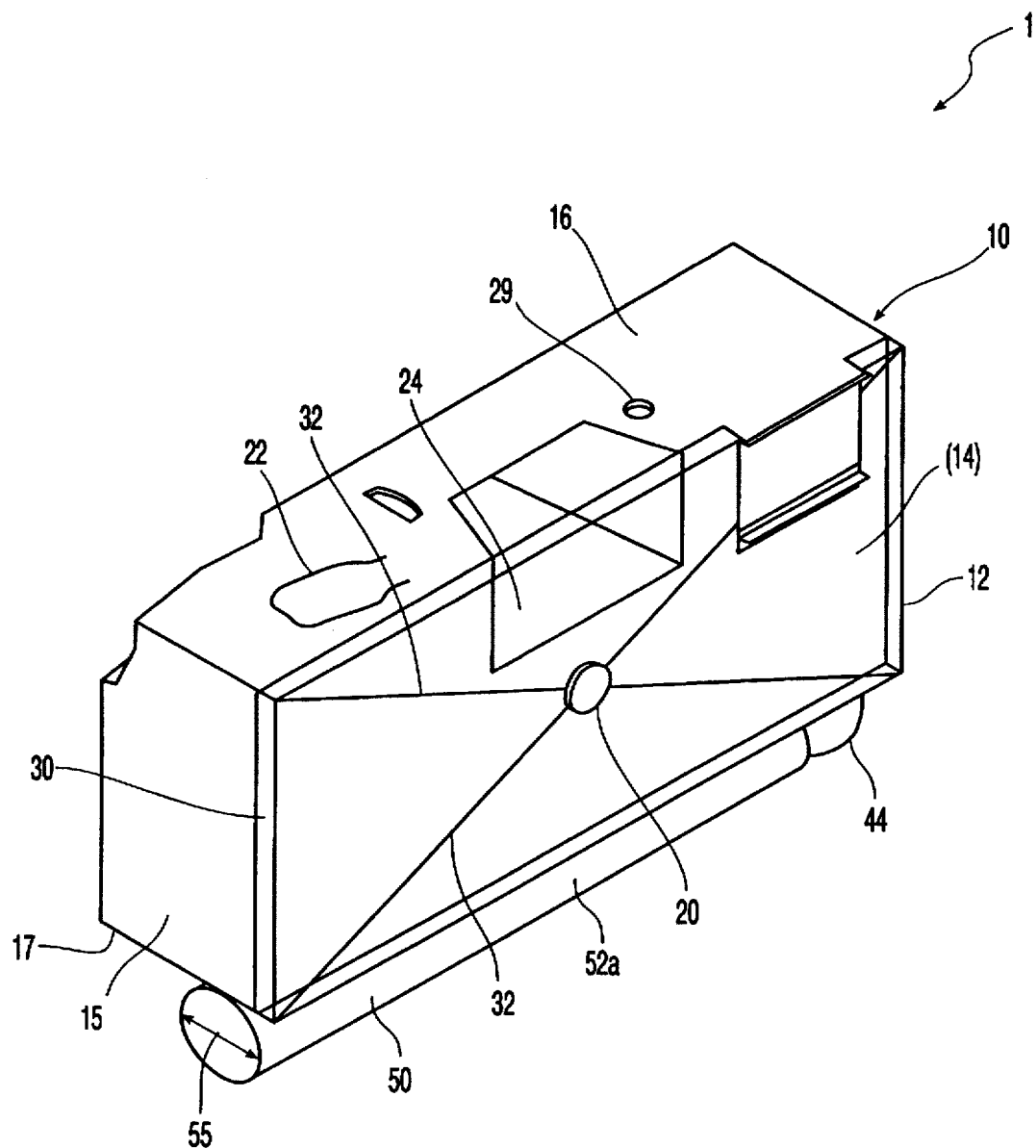
FIG. 10 is a perspective view of the camera in FIG. 9 in a retracted position.
Figure 11:
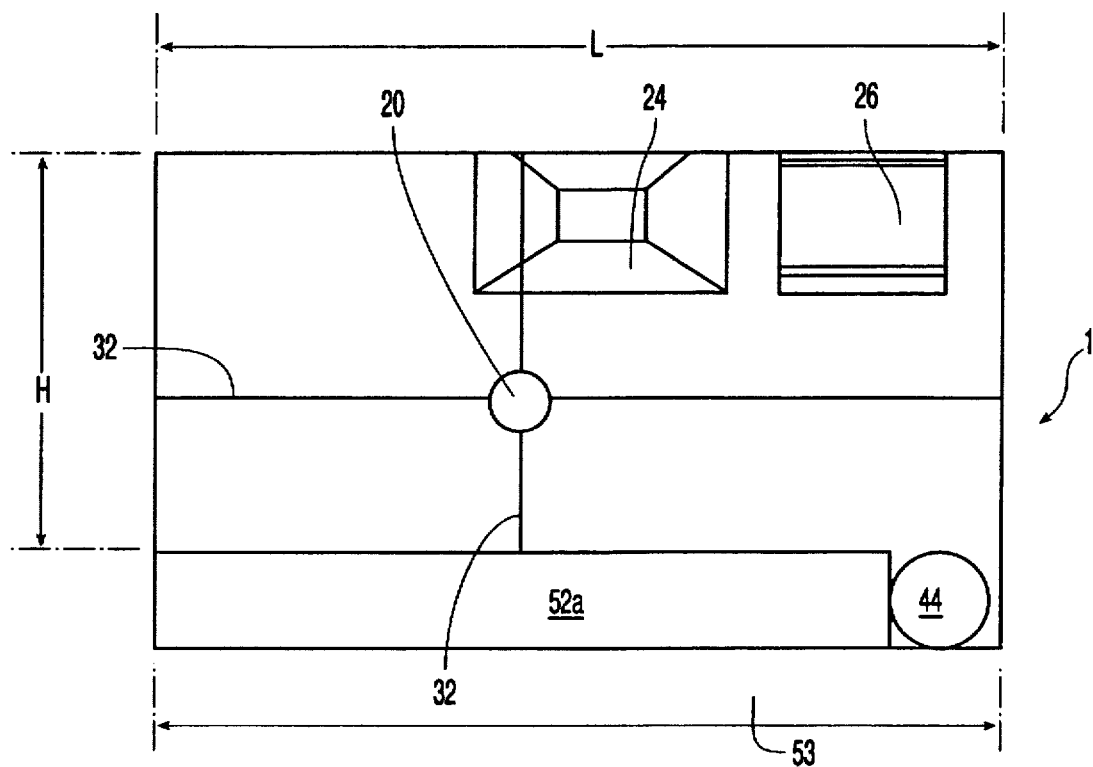
FIG. 11 is a front view of the camera shown in FIG. 10.
Figure 12:
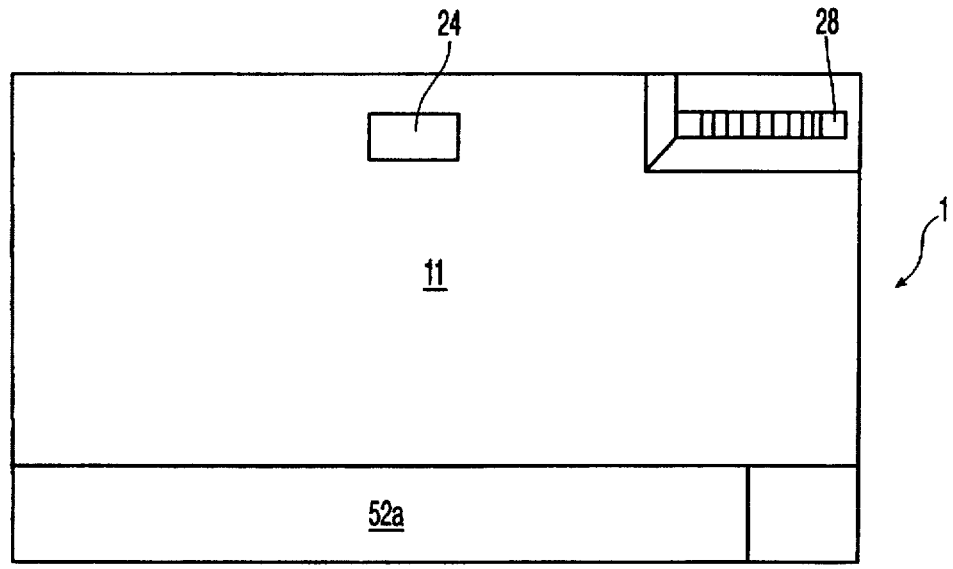
FIG. 12 is a rear view of the camera shown in FIG. 10.

In a first preferred embodiment as shown in FIGS. 1–8, one supporting arm 50 is provided extending away from the camera unit 10 for the user to hold. The supporting arm 50 comprises a plurality of telescoped arm sections 52 movable between an extended position (FIG. 1) and a closed/retracted position (FIG. 2). The base section 52a of the supporting arm 50 is attached to the bottom 17 of the camera unit 10 by a screw means 59 (FIG. 6). The supporting arm 50 is thus pivotable for about 90° between the extended position and the closed/retracted position.

The supporting arm 50 is in the form of a typical telescoped rod 50 so that the arm sections 52 can tightly slide within one another at the closed/retracted position. The arm sections 52 of the supporting rod 50 have a length 53 that is slightly shorter than the length L of the camera unit 10 so that they can retract into one another and the entire telescoped rod 50 can thus be folded underneath the housing 12 at the closed position. Further, the diameter 55 of the arm sections 52 should be less than or equal to the width W of the camera unit 10. Each of the arm sections 52 adopts conventional interlocking means (not shown), such as ribs and channels, thereon. The interlocking means prevents the arm sections 52 from retracting undesirably when the supporting arm 50 is fully extended.

Figure 16:
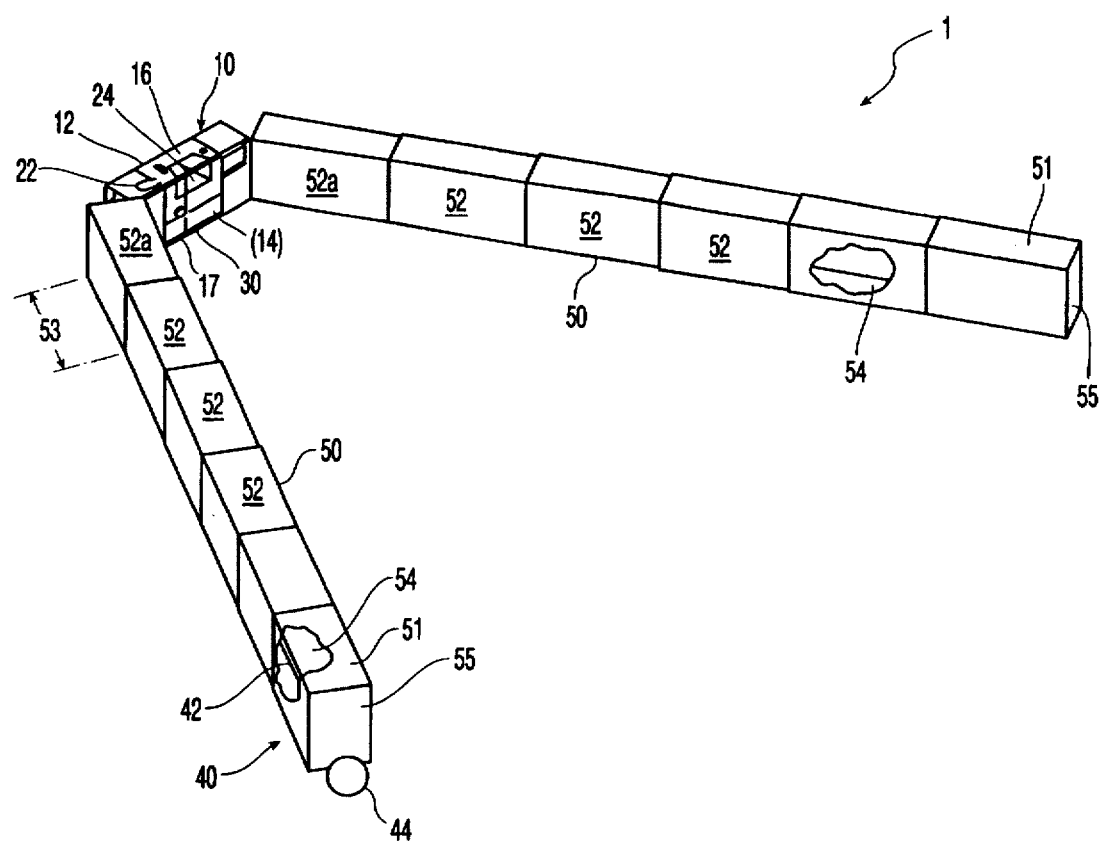
FIG. 16 is a perspective view of a third embodiment of the present invention as the camera is being used.

In addition, the arm sections 52 of the telescope supporting arm 50 define a through chamber 54 (FIG. 16). Such chamber 54 can be used to pass the remote shutter release mechanism 40 from the camera unit 10 to the remote end 51 of the supporting arm 50.

Referring to FIGS. 9–15, a second preferred embodiment according to the present invention is shown. In this embodiment, same elements are designated same numeral references as in the previous preferred embodiment. The camera 1 shown in FIGS. 9–15 is similar to that discussed hereinabove and only the differences will be described.

The camera 1 of the current preferred embodiment employs two supporting rods 50. One of such supporting rods 50 contains a remote shutter release mechanism 40 passing therethrough. It is a further advantage to have two rods since the camera direction can be changed with more ease. Moreover, the two arms provide more support. The diameter 55 of these rods should be equal to or less than one-half the width W of the camera unit 10 so that they can be stored under the camera unit 10 against the bottom 17.

Figure 17:
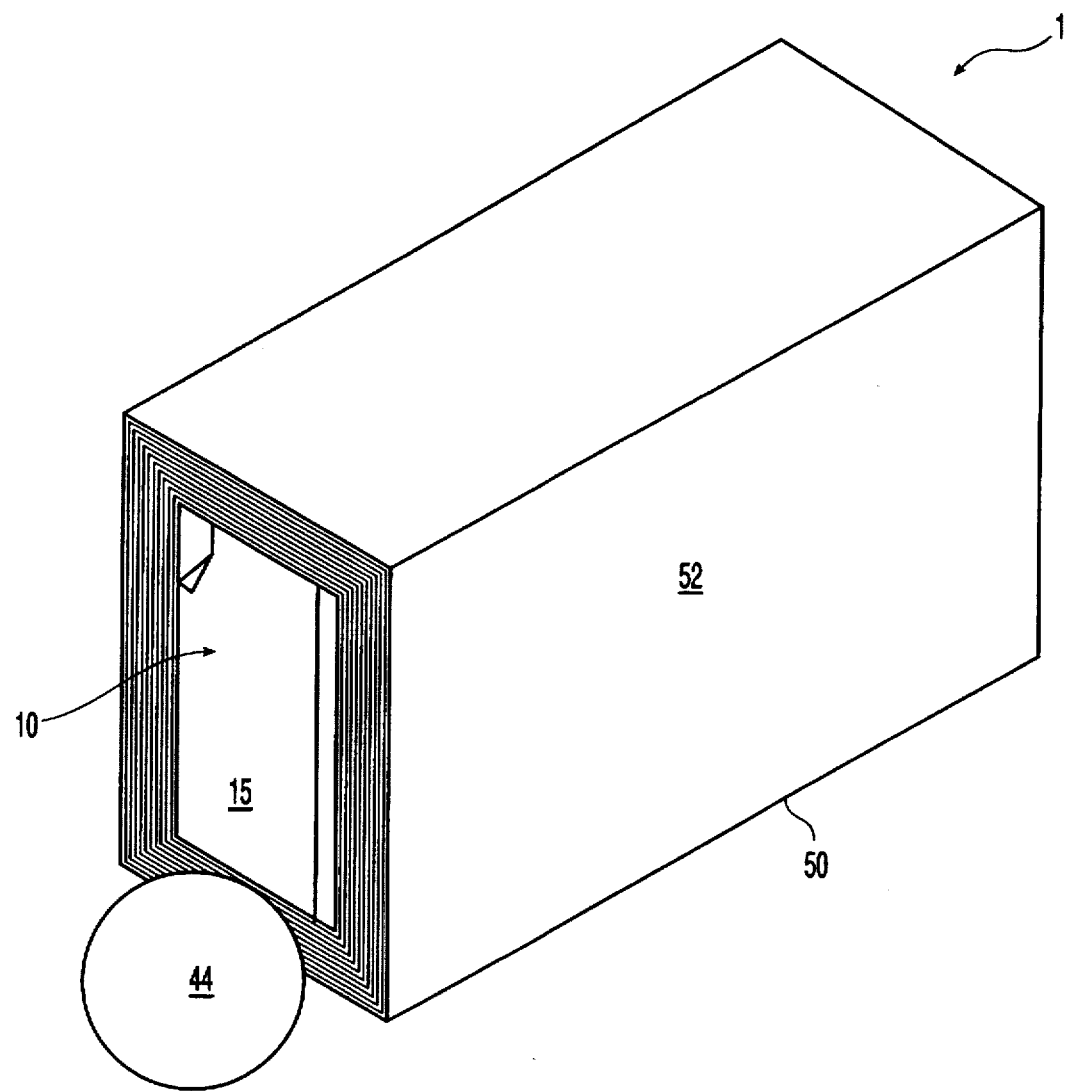
FIG. 17 is a perspective view of the camera in FIG. 16 in a retracted position.

FIGS. 16 and 17 show another preferred embodiment of the present invention. Similarly, same elements are designated same numeral references as in the previous embodiments and only the distinctions of this preferred embodiment will be described hereinafter.

In the current embodiment, the base sections 52a are connected to the camera unit 10 by hinging. The cross-section of each arm section 52 and its through chamber 54 is rectangular. The area of each through chamber 54 is sufficiently large so that the camera unit 10 can be received therein when the supporting arm 50 is retracted. Further, the length 53 of each arm section 52 is slightly longer than the length L of the camera unit 10. Therefore, the entire camera unit 10 can be received within the arm sections 52 when the telescoped supporting arm 50 is retracted. A further advantage of this embodiment is that the arm sections 52 with the ends 55 (not shown in FIG. 17 so that the camera unit 10 can be seen) protect the camera unit 10.

Figure 18:
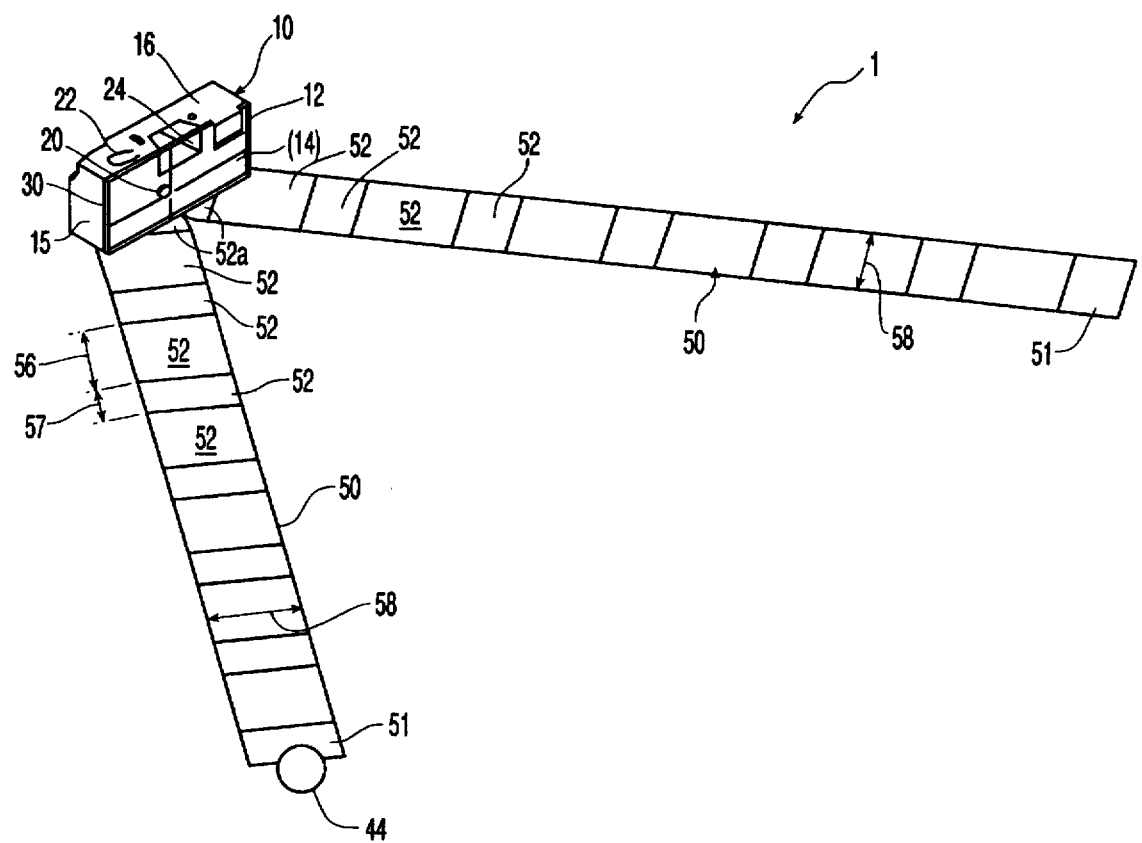
FIG. 18 is a perspective view of a forth embodiment of the present invention as the camera is being used.
Figure 19:
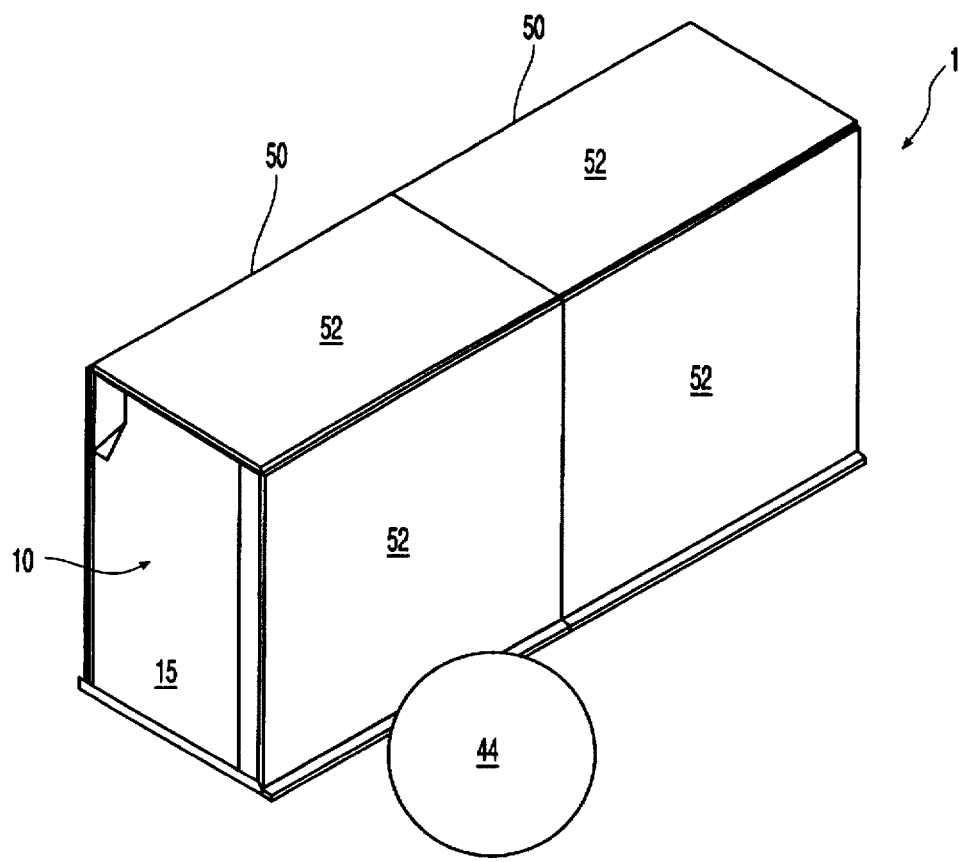
FIG. 19 is a perspective view of the camera in FIG. 18 in a retracted position.
Figure 20:
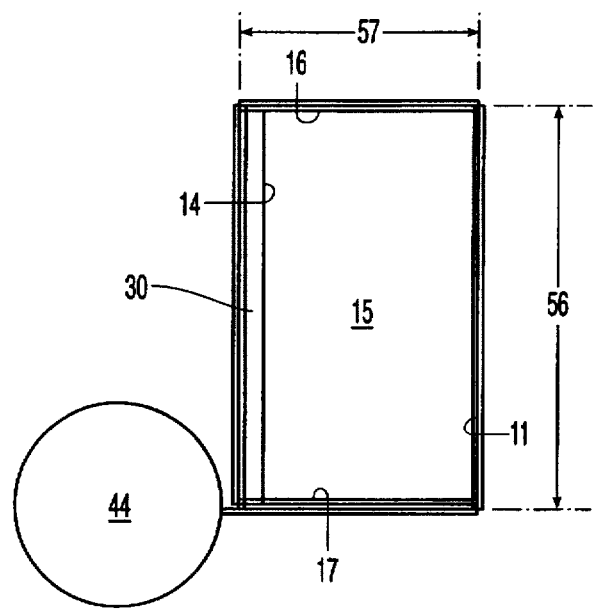
FIG. 20 is a right side view of the camera as shown in FIG. 19.

FIGS. 18–20 show a further preferred embodiment of the present invention, in which same elements are designated same numeral references as in the previously discussed embodiments. Similarly, only the distinctions of this preferred embodiment will be described hereinafter. According to the current preferred embodiment, the supporting arm 50 has a plurality of hinged arm sections 52 adapted for repeatedly opening and closing/retracting the supporting arm 50. The base section 52a is pivotally attached to the bottom 17 of the housing 12.

The arm sections 52 can have alternating lengths 56 and 57 substantially equal to the height H and width W of the camera unit 10. Each arm section 52 locks within one another as the supporting arm 50 folds upon itself and the camera unit 10 so that the arm sections 52 can wrap around the camera unit 10. Thus, the supporting arms 50 can be folded to protect the camera unit 10. Alternatively, the arm sections 52 can have lengths 56 and 57 that are substantially equal either the height H or the width W of the camera unit 10 so that the arm sections 52 can be stacked and kept next to either the front face 14 or the bottom 17 of the camera unit 10. Preferably, the arm sections 52 can be sized to fold under the camera unit 10 against the bottom 17 thereof. This enables the user to more easily use the camera in a normal (not self-portrait) mode.

When two supporting arms 50 are provided, each of the arms can have a width 58 that is equal to half of the length L of the camera unit 10. Therefore, both supporting arms 50 can be folded next to the camera unit 10. In this case, one of the supporting arms 50 can have each of its arm sections 52 define a through hole (not shown) for passing the remote shutter release mechanism 40 therethrough.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A camera comprising:

a camera unit including a housing with a front face and a bottom, a lens assembly and a view finder located within the housing and extending to the front face of the housing and a shutter located within the housing;

a mirror member covering substantially the front face of the housing and being discontinued where the lens and the view finder extend to the front face, the mirror member being marked with at least two lines that would intersect near the center of the lens;

at least one supporting arm mounted to the housing and extending therefrom to a remote end for the user to hold, the supporting arm having a plurality of telescoped arm sections including a base section, the base section being pivotally mounted to the housing of the camera unit, the supporting arm having each of its arm sections define a through chamber for passing the remote shutter release mechanism therethrough to extend from the housing of the camera unit to the remote end of the supporting arm, and a remote shutter release mechanism substantially at the remote end;

whereby one or more users can hold the camera away from themselves, locate themselves in the mirror and use the remote shutter release mechanism to take portrait type pictures.

2. The camera of claim 1 wherein the supporting arm is a rod, the base section of the telescoped rod being mounted to the bottom of the housing.

3. The camera of claim 2 wherein the camera unit has a first length and each section of the supporting arm has a length shorter than the length of the camera unit so that the telescoped rod can be folded underneath the housing when the telescoped rod is retracted.

4. The camera of claim 1 wherein the cross-section of each through chamber is rectangular, the area of the cross-section being sufficiently large so that the arm section can receive the camera unit therein.

5. The camera of claim 4 wherein the camera unit has a first length and each section of the supporting arm has a length longer than the length of the camera unit so that the camera unit can be received within the arm sections when the telescoped supporting arm is retracted.

6. The camera of claim 1 wherein the remote shutter release mechanism comprises a pneumatic cable with a remote end and an air bulb connected at the remote end.

7. The camera of claim 3 wherein one of the lines extends horizontally and the other vertically such that they would intersect with each other at the camera lens.

8. The camera of claim 3 wherein the lines extend diagonally across the front face of the housing such that they would intersect with each other at the camera lens.

9. The camera of claim 3 wherein the mirror member is substantially flat, the mirror member being an optical quality plastic with a silver metal backing.

10. The camera of claim 3 wherein the supporting arm has a length of greater than two feet.

11. The camera of claim 3 wherein the camera unit and the supporting arm are made of a plastic material.

12. The camera of claim 3 wherein the camera unit is a disposable camera.

13. A camera comprising:

a camera unit including a housing with a front face and a bottom, a lens assembly and a view finder located within the housing and extending to the front face of the housing and a shutter located within the housing;

a mirror member covering substantially the front face of the housing and being discontinued where the lens and the view finder extend to the front face, the mirror member being marked with at least two lines that would intersect near the center of the lens;

at least one supporting arm mounted to the housing and extending therefrom to a remote end for the user to hold, the supporting arm having a plurality of hinged arm sections including a base section, the base section being pivotally mounted to the bottom of the housing of the camera unit; and a remote shutter release mechanism substantially at the remote end;

whereby one or more users can hold the camera away from themselves, locate themselves in the mirror and use the remote shutter release mechanism to take portrait type pictures.

14. The camera of claim 13 wherein the arm sections have lengths substantially equal to the height and thickness of the camera unit alternatively so that the arm sections can wrap around the camera unit.

15. The camera of claim 13 wherein the arm sections have a length substantially equal to one of the height and the thickness of the camera unit so that the arm sections can be rolled up and kept next to one of the front face and the bottom of the camera unit.

16. The camera of claim 13 wherein one of the at least one supporting arm has each of its arm sections define a through hole for passing the remote shutter release mechanism therethrough.

* * * * *